(12) United States Patent
Dirik et al.

(10) Patent No.: US 8,687,941 B2
(45) Date of Patent: Apr. 1, 2014

(54) AUTOMATIC STATIC VIDEO SUMMARIZATION

(75) Inventors: Ahmet Emir Dirik, Bursa (TR);
Jennifer Lai, Garrison, NY (US);
Mercan Topkara, Thornwood, NY (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 12/915,584

(22) Filed: Oct. 29, 2010

(65) Prior Publication Data

US 2012/0106925 A1    May 3, 2012

(51) Int. Cl.
*H04N 9/80*    (2006.01)

(52) U.S. Cl.
USPC ............................. 386/240; 386/241

(58) Field of Classification Search
USPC ................................. 386/240, 241
See application file for complete search history.

(56) References Cited

U.S. PATENT DOCUMENTS

| | | | |
|---|---|---|---|
| 6,535,639 B1 | 3/2003 | Uchihachi et al. | |
| 6,646,655 B1 | 11/2003 | Brandt et al. | |
| 6,690,725 B1 | 2/2004 | Abdeljaoud et al. | |
| 6,956,573 B1 * | 10/2005 | Bergen et al. | 345/473 |
| 7,143,352 B2 | 11/2006 | Divakaran et al. | |
| 7,149,974 B2 | 12/2006 | Girgensohn et al. | |
| 7,151,852 B2 | 12/2006 | Gong et al. | |
| 7,203,620 B2 | 4/2007 | Li | |
| 7,212,666 B2 | 5/2007 | Zhang et a | |
| 7,246,314 B2 * | 7/2007 | Foote et al. | 715/700 |
| 7,466,858 B2 * | 12/2008 | Denoue et al. | 382/170 |
| 7,509,347 B2 * | 3/2009 | Chambers | 1/1 |
| 7,530,021 B2 | 5/2009 | Cheng et al. | |
| 7,593,618 B2 | 9/2009 | Xu et al. | |
| 7,613,365 B2 | 11/2009 | Wang et al. | |
| 7,679,518 B1 | 3/2010 | Pabla et al. | |
| 8,200,063 B2 * | 6/2012 | Chen et al. | 386/242 |

(Continued)

FOREIGN PATENT DOCUMENTS

| | | |
|---|---|---|
| CN | 1581163 A | 2/2005 |
| EP | 1456779 B1 | 9/2004 |

OTHER PUBLICATIONS

A. Jaimes et al., "Memory Cues for Meeting Video Retrieval," Proceedings of the 1st ACM Workshop on Continuous Archival and Retrieval of Personal Experiences (CARPE), Oct. 2004, pp. 74-85.

(Continued)

*Primary Examiner* — Thai Tran
*Assistant Examiner* — Jose Mesa
(74) *Attorney, Agent, or Firm* — William Stock; Ryan, Mason & Lewis, LLP

(57) ABSTRACT

Techniques are disclosed for automatic static summarization of videos. For example, a method of creating a static summary of a video comprises the following steps. Shots in the video are detected, wherein the detected shots are frames of the video having a correlation. The detected shots are clustered into clusters based on similarity. The clusters of shots are ranked. At least a portion of the shots are selected based on cluster ranking for inclusion in the static summary. The static summary is generated by combining thumbnail images of the selected shots. Prior to the ranking step, the method may further comprise detecting a presence of slides in any of the shots, and the ranking of a given shot is based in part on whether the shot is a slide. By way of example, such static summaries can be shared in emails and in calendar applications.

23 Claims, 13 Drawing Sheets

(56) References Cited

U.S. PATENT DOCUMENTS

| | | | |
|---|---|---|---|
| 2002/0069218 A1* | 6/2002 | Sull et al. | 707/501.1 |
| 2002/0097277 A1 | 7/2002 | Pitroda | |
| 2003/0081937 A1 | 5/2003 | Li | |
| 2003/0236792 A1 | 12/2003 | Mangerie et al. | |
| 2004/0139042 A1 | 7/2004 | Schirmer et al. | |
| 2005/0151735 A1 | 7/2005 | Boekhorst | |
| 2006/0047816 A1 | 3/2006 | Lawton et al. | |
| 2007/0046669 A1 | 3/2007 | Choi et al. | |
| 2007/0112926 A1 | 5/2007 | Brett et al. | |
| 2007/0168864 A1 | 7/2007 | Yamamoto et al. | |
| 2008/0027921 A1 | 1/2008 | Chandrasekar et al. | |
| 2008/0077869 A1 | 3/2008 | Cho et al. | |
| 2008/0082557 A1 | 4/2008 | Ohara et al. | |
| 2008/0109848 A1 | 5/2008 | Li et al. | |
| 2008/0320509 A1* | 12/2008 | Gustafson et al. | 725/23 |
| 2009/0006608 A1 | 1/2009 | Gupta et al. | |
| 2009/0049129 A1 | 2/2009 | Faisal et al. | |
| 2009/0080853 A1 | 3/2009 | Chen et al. | |
| 2009/0119246 A1 | 5/2009 | Kansal | |
| 2009/0125365 A1 | 5/2009 | Masselle et al. | |
| 2009/0177469 A1 | 7/2009 | Findlay | |
| 2009/0177774 A1 | 7/2009 | Rehman et al. | |
| 2009/0234721 A1 | 9/2009 | Bigelow et al. | |
| 2009/0271438 A1 | 10/2009 | Agapi et al. | |
| 2009/0287685 A1 | 11/2009 | Charnock et al. | |
| 2010/0039296 A1 | 2/2010 | Marggraff et al. | |
| 2010/0114627 A1 | 5/2010 | Adler et al. | |
| 2010/0153160 A1 | 6/2010 | Bezemer et al. | |
| 2010/0191741 A1 | 7/2010 | Stefik et al. | |
| 2010/0299763 A1 | 11/2010 | Marcus et al. | |
| 2010/0312726 A1 | 12/2010 | Thompson et al. | |
| 2011/0022967 A1 | 1/2011 | Vijayakumar et al. | |
| 2011/0078635 A1 | 3/2011 | Fried | |
| 2011/0137988 A1 | 6/2011 | Balogh et al. | |
| 2011/0282706 A1 | 11/2011 | Ezra et al. | |
| 2013/0132138 A1 | 5/2013 | Doganata et al. | |

OTHER PUBLICATIONS

M-M. Bouamrane et al., "Meeting Browsing," Multimedia Systems, Mar. 2007, pp. 439-457, vol. 12, No. 4-5.
D. Hindus et al., "Ubiquitous Audio: Capturing Spontaneous Collaboration," Proceedings of the ACM Conference on Computer-Supported Cooperative Work (CSCW), Nov. 1992, pp. 210-217, Toronto, Ontario, Canada.
S. Luz et al., "Meeting Browser: A System for Visualising and Accessing Audio in Multicast Meetings," IEEE 3rd Workshop on Multimedia Signal Processing, Sep. 1999, pp. 587-592, Copenhagen, Denmark.
J.R. Rohlicek et al., "Continuous Hidden Markov Modeling for Speaker-Independent Word Spotting," International Conference on Acoustics, Speech, and Signal Processing (ICASSP), May 1989, pp. 627-630, vol. 1, Glasgow, U.K.
J.C. Reynar, "Topic Segmentation: Algorithms and Applications," Dissertation in Computer and Information Science, University of Pennsylvania, 1998, 187 pages.
F.C. Li et al., "Browsing Digital Video," Proceedings of the SIGCHI Conference on Human Factors in Computing Systems, Apr. 2000, pp. 169-176, The Hague, The Netherlands.
A. Waibel et al., "Meeting Browser: Tracking and Summarizing Meetings," Proceedings of the Broadcast News Transcription and Understanding Workshop, Feb. 1998, pp. 281-286.
S. Ram et al., "A New Perspective on Semantics of Data Provenance," Proceedings of the 1st International Workshop on the Role of Semantic Web in Provenance Management (SWPM), Oct. 2009, 6 pages.
A-W. Scheer et al., "ARIS Architecture and Reference Models for Business Process Management," Business Process Management, Models, Techniques, and Empirical Management, 2000, pp. 376-389, vol. 1806.
F. Curbera et al., "Business Provenance—A Technology to Increase Traceability of End-to-End Operations," Proceedings of the OTM Confederated International Conference, Part 1, LNCS, Nov. 2008, pp. 100-119, Monterrey, Mexico.

W. Geyer et al., "Towards a Smarter Meeting Record—Capture and Access of Meetings Revisited," Multimedia Tools and Applications, Dec. 2005, pp. 393-410, vol. 27, No. 3.
G.M. Olson et al., "Distance Matters," Human-Computer Interaction, Sep. 2000, pp. 139-178, vol. 15, No. 2.
P-Y. Hsueh et al., "Improving Meeting Summarization by Focusing on User Needs: A Task-Oriented Evaluation," Proceedings of the International Conference on Intelligent User Interfaces (IUI), Feb. 2009, pp. 17-26.
R. Gross et al., "Towards a Multimodal Meeting Record," Proceedings of IEEE International Conference on Multimedia and Expo (ICME), Jul. 2000, pp. 1593-1596.
M-M. Bouamrane et al., "Navigating Multimodal Meeting Recordings with the Meeting Miner," 7th International Conference on Flexible Query Answer System (FQAS), Lecture Notes in Computer Science, Jun. 2006, pp. 356-367, vol. 4027, Milan, Italy.
S. Luz et al., "A Model for Meeting Content Storage and Retrieval," Proceedings of the 11th International Multimedia Modelling Conference, Jan. 2005, pp. 392--398, Melbourne, Australia.
A. Waibel et al., "Advances in Automatic Meeting Record Creation and Access," Proceedings of the IEEE International Conference on Acoustics, Speech, and Signal Processing (ICASSP), May 2001, pp. 597-600, vol. 1.
W. Geyer et al., "Virtual Meeting Support in TeamSpace," Demo proposal accepted at the ACM Conference on Computer-Supported Cooperative Work (CSCW), Dec. 2000, 4 pages.
L. Wu et al., "Vaue of social network—A Large-scale analysis on network structure impact to financial revenue of information technology consultants," presented at the Winter Information Systems Conference, 2009, 25 pages, Salt Lake City.
C-Y. Lin et al., "SmallBlue: People Mining for Expertise Search,". IEEE MultiMedia, Jan. 2008, pp. 78-84, http://dx.doi.org/10.1109/MMUL.2008.17, vol. 15, No. 1.
Florian et al., "A Statistical Model for Multilingual Entity Detection and Tracking," HLT, 2004, 8 pages.
J.R. Bellegarda, "Latent Semantic Mapping, Signal Processing Magazine," IEEE 2005, pp. 70-80.
D. Blei., "Introduction to Probabilistic Topic Models," Communications of the ACM 2011, pp. 1-16.
Topkara et al., "Tag Me While You Can: Making Online Recorded Meetings Shareable and Searchable," IBM Research Report, rc25038, (w1008-057), Aug. 18, 2010, 11 pages.
Y.L. Simmhan et al., "A Framework for Collecting Provenance in Data-Centric Scientific Workflows," 2006, 8 pages, Indiana University, Bloomington, Indiana.
H. Lonsdale, "Using Provenance to Aid Document Re-Finding," M.S. Thesis, Oregon State University, Covallis, OR., 2009.
S. Stumpf et al., "The Use of Provenance in Information Retrieval, Workshop on Principles of Provenance (PROPR)," Edinburgh, Scotland, Nov. 19-20, 2007.
M.K. Anand et al., "Exploring Scientific Workflow Provenance Using Hybrid Queries Over Nested Data and Lineage Graphs," Proceedings of the 21st International Conference on SSDM, pp. 237-254, Springer, Heidelberg, 2009.
M.K. Anand et al., "A Navigation Model for Exploring Scientific Workflow Provenance Graphs," Proceedings of the 4th Workshop on Workflows in Support of Large-Scale Science, pp. 1-10, ACM, New York, 2009.
L. Wang et al., "Atomicity and Provenance Support for Pipelined Scientific Workflows," Future Generation Computer Systems, May, 2009, pp. 568-576, vol. 25, No. 5.
T. Gibson et al., "Application of Named Graphs Towards Custom Provenance Views," First Workshop on Theory and Practice of Provenance, USENIX Association, San Francisco, CA, 2009.
A. Hanjalic et al., "An Integrated Scheme for Automated Video Abstraction Based on Unsupervised Cluster-Validity Analysis," http://repository.tudelft.nl/assets/uuid:11893f52-4aed-47ad-a7e6-9fc46627699b/ieee_hanjalic_1999.pdf, 2009, pp. 1280-1289.
D.M. Russell, "A Design Pattern-based Video Summarization Technique: Moving from Low-level Signals to High-level Structure," 2000, IEEE, System Sciences, Proceedings of the 33rd Annual Hawaii International Conference.

(56) References Cited

OTHER PUBLICATIONS

Y.F. Ma et al., "A User Attention Model for Video Summarization," In Proceedings of ACM Multimedia, 2002, 10 pages, France.
B.L. Tseng et al., "Video Summarization and Personalization for Pervasive Mobile Devices," IBM, 2002, 12 pages.
B.L. Tseng et al., "Using MPEG-7 and MPEG-21 for Personalizing Video," IEEE, 2004, pp. 42-52.
A. Haubold et al., "Augmented Segmentation and Visualization for Presentation Videos," ACM, Nov. 2005, 10 pages, Singapore.
C-W. Ngo et al., "Video Summarization and Scene Detection by Graph Modeling," IEEE Trans. Circuits Syst. Video Technol, 2005.
C.M. Taskiran, "Automated Video Program Summarization Using Speech Transcripts," IEEE Transactions on Multimedia, Aug. 2006, pp. 775-791, vol. 8, No. 4.
B.T. Truong et al., "Video Abstraction: A Systematic Review and Classification," 2007.
J. Sasongko et al., "Efficient Generation of Pleasant Video Summaries," TRECVid Video Summarization Workshop, (TVS), Oct. 2008, Canada.
J. Basak et al., "Video Summarization with Supervised Learning," IBM, 2008.
B.W. Chen et al., "A Novel Video Summarization Based on Mining the Story-Structure and Semantic Relations Among Concept Entities," IEEE Transactions on Multimedia, Feb. 2009.
M. Lux et al., "A Novel Tool for Quick Video Summarization using Keyframe Extraction Techniques," Proceedings of the 9th Workshop of the Multimedia Metadata Community, 2009, pp. 62-76, France.

\* cited by examiner

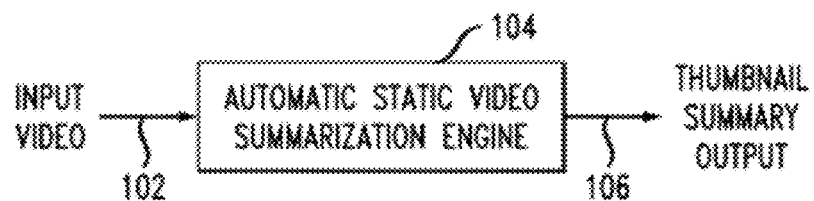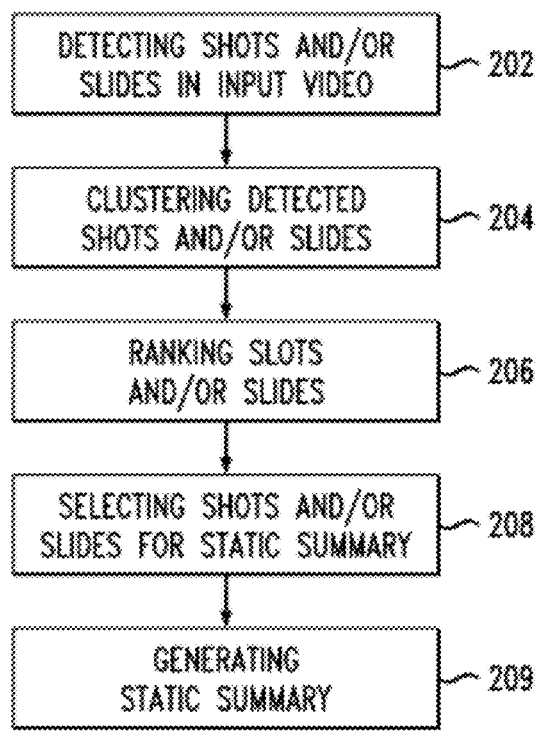

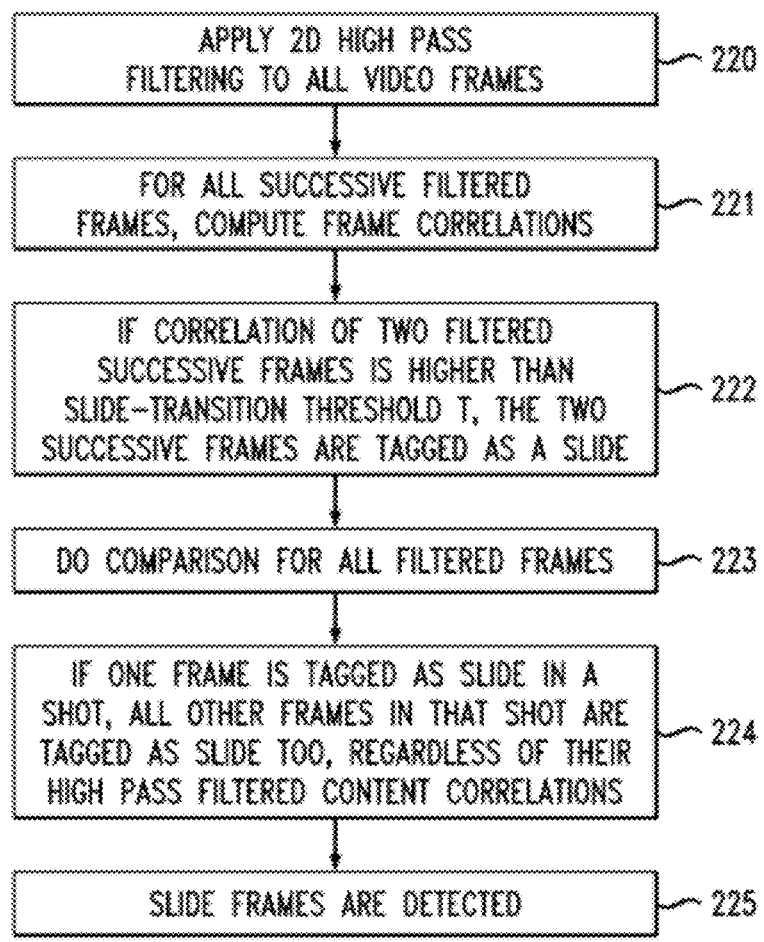

300

400

FIG. 5A
500
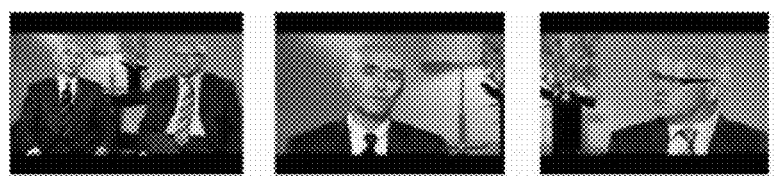
⇓ 2D HIGH-PASS FILTER
LOW CORR.   LOW CORR.
FIG. 5B
520
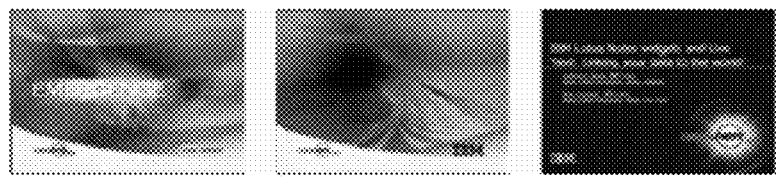
⇓ 2D HIGH-PASS FILTER
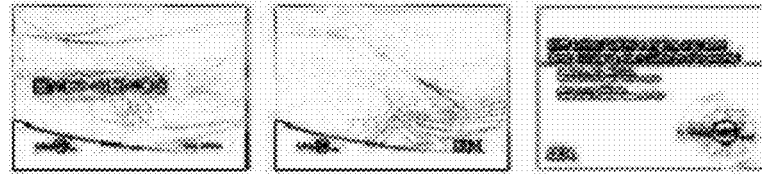
HIGH CORR.   LOW CORR.

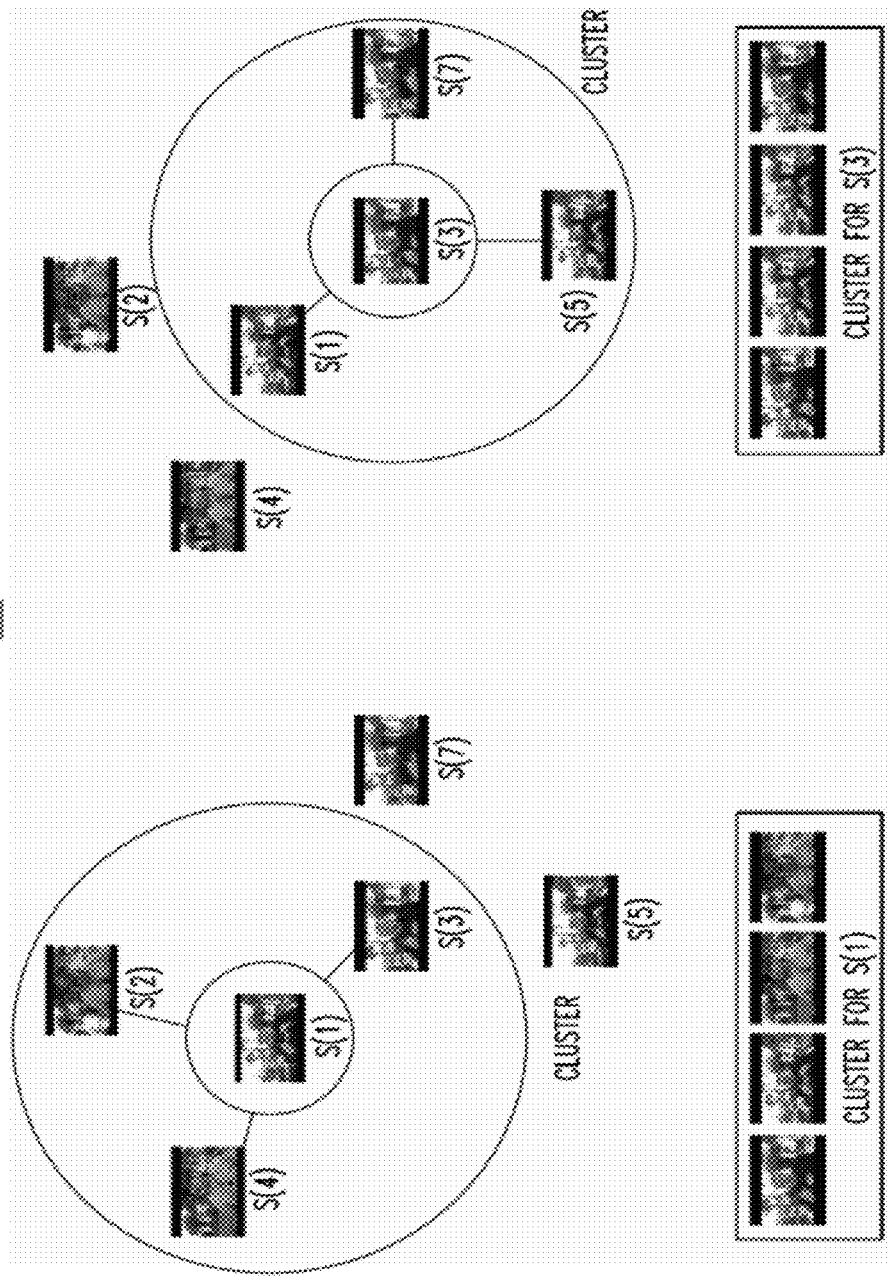

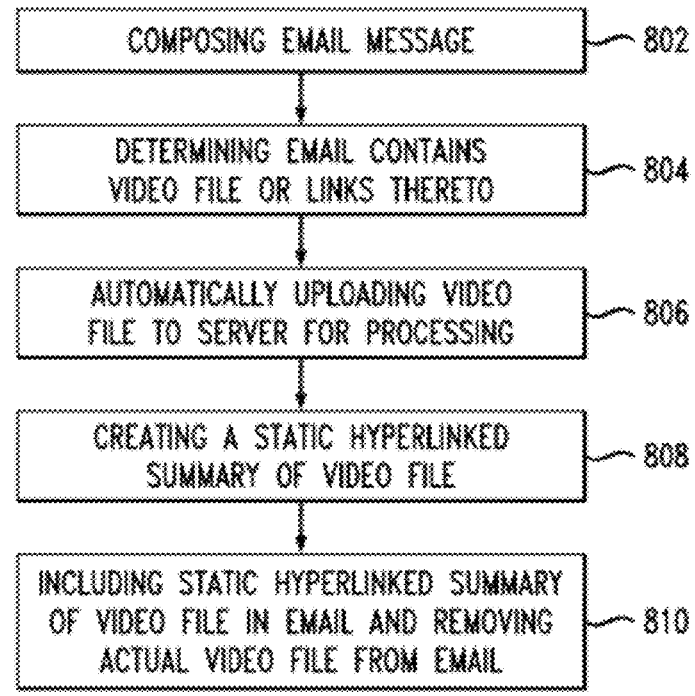
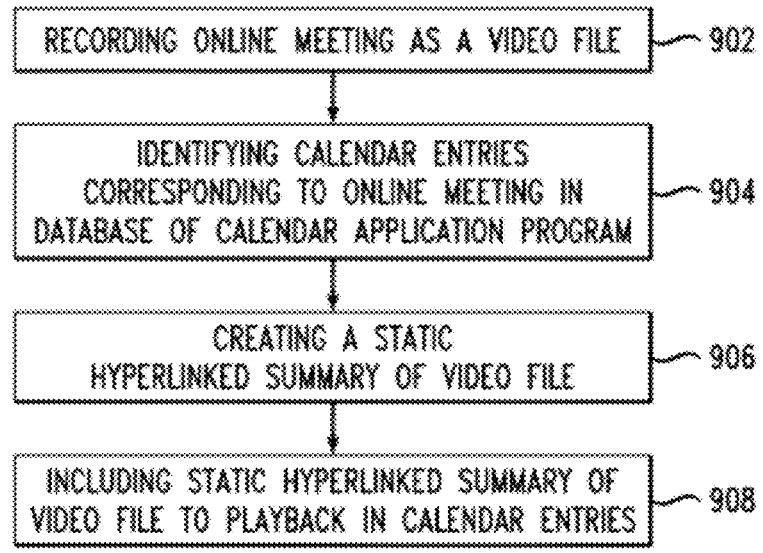

AUTOMATIC STATIC VIDEO SUMMARIZATION

FIELD OF THE INVENTION

The present invention relates to video processing and, more particularly, to automatic static summarization of videos and sharing of such summarizations.

BACKGROUND OF THE INVENTION

As tools for sharing video files become more widely available, there has been a resulting increase in the amount of multimedia content available on the Internet. People now face a new challenge of viewing large amounts of multimedia content.

Further, using video files, people can share complex or voluminous data (e.g., a demonstration of software, a talk or an event). In enterprises, more and more of the meetings and presentations are being recorded and made available online on an Intranet or the Internet. Since video files, are large in size (e.g., ranging from megabytes to gigabytes for compressed formats), storing, sharing, and searching the video data brings new challenges in terms of cost, space, and time to enterprises.

In general, there are three main ways of sharing videos:

1. Video sharing systems (e.g., YouTube™, service available from YouTube LLC, San Bruno, Calif.): In this case, the time cost is mainly associated with the upload time for the video. The space cost is limited to one copy of the file. Uploading puts a burden on the enterprise network bandwidth, also there is a cost of building or buying a secure and efficient video sharing system within the enterprise.

2. File sharing systems (e.g., Cattail™, service available from IBM Corporation, Armonk, N.Y.): In this case, both upload and download times are incurred in the time cost. The space cost is limited to one copy of the file unless downloaders keep the copy of the video file in their personal computer/mobile device. This system puts a burden on the network due to the upload and multiple downloads (one for each viewer), and there is the cost of building or buying a secure and efficient file sharing system.

3. Email attachment: In this case, both upload and download times are incurred; the space cost will be multiplied by the number of people on the "send-to:" list. This way of sharing a video puts burden on the enterprise network bandwidth since the emails are delivered to each recipient's mail box, and later another burden is inflicted when the receiver starts downloading a copy to their personal computer/mobile device. There will be extra costs if the enterprise is outsourcing the email service and paying for the storage.

In addition to costs of time, bandwidth and storage, a greater problem is introduced when a video is shared via email; the problem being that the person receiving the link has no way of identifying whether the video is of interest to them or not.

SUMMARY OF THE INVENTION

Principles of the invention provide video processing techniques that overcome the above and other drawbacks. More particularly, principles of the invention provide for automatic static summarization of videos.

For example, in one aspect of the invention, a method of creating a static summary of a video comprises the following steps. Shots in the video are detected, wherein the detected shots are frames of the video having a correlation. The detected shots are clustered into clusters based on similarity. The clusters of shots are ranked. At least a portion of the shots are selected based on cluster ranking for inclusion in the static summary. The static summary is generated by combining thumbnail images of the selected shots. In one embodiment, prior to the ranking step, the method may further comprise detecting a presence of slides in any of the shots, and the ranking of a given shot is based in part on whether the shot is a slide.

In another aspect of the invention, a method comprises composing an email message. A determination is made as to whether the email message contains a video file as an attachment or a link to a video file. A static hyperlinked summary of the video file is created. The summary is included in the email message in place of the video file. Some or all of the video file is selectable for playback using one or more hyperlinks associated with the summary.

In yet another aspect of the invention, a method comprises recording a meeting as a video file. One or more calendar entries corresponding to the meeting are identified in a database of a calendar application program. A static hyperlinked summary of the video file is created. The summary is included in the one or more calendar entries. Some or all of the video file is selectable for playback using one or more hyperlinks associated with the summary.

Advantageously, static video summarization techniques are provided for use in various applications (e.g., email application, calendar application, etc.) which address cost issues such as time, bandwidth and storage, as well as solving the problem of a person not being able to identify whether the video is of interest to them or not before they actually view the video. That is, the inventive summarization gives the person a string of thumbnail images that are representative of the content of the video so that the person can decide whether to view part or all of the video by clicking on one or more playback hyperlinks.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIG. 1 illustrates an automatic static video summarization system, according to an embodiment of the invention.

FIG. 2A illustrates an automatic static video summarization methodology, according to an embodiment of the invention.

FIG. 2C illustrates a slide detection methodology, according to an embodiment of the invention.

FIGS. 5A and 5B illustrate examples of slide detection, according to an embodiment of the invention.

FIG. 6 illustrates an example of cluster selection, according to an embodiment of the invention.

FIG. 7A illustrates an example of thumbnail summary results and corresponding text files, according to an embodiment of the invention.

FIG. 8 illustrates an email generation methodology, according to an embodiment of the invention.

FIG. 9 illustrates a calendar entry generation methodology, according to an embodiment of the invention.

DETAILED DESCRIPTION OF PREFERRED EMBODIMENTS

Figure 2B:
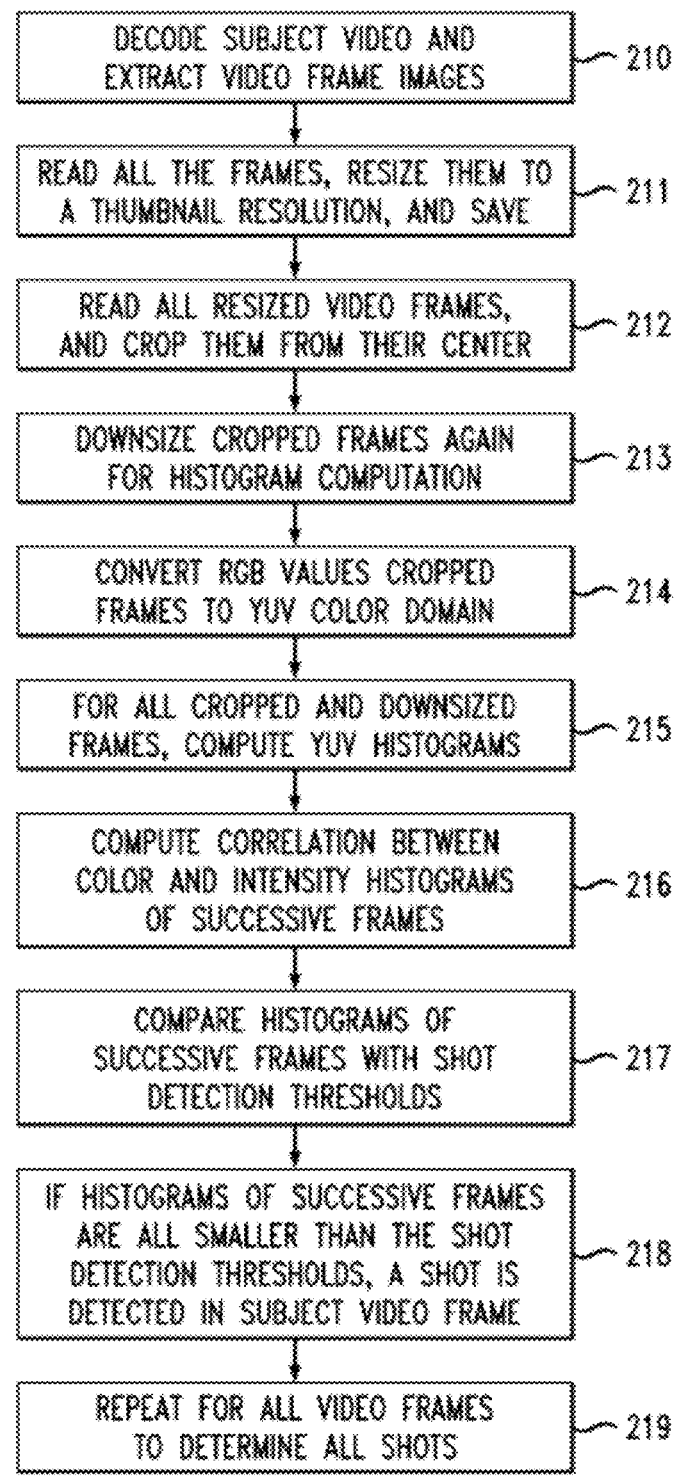
FIG. 2B illustrates a shot detection methodology, according to an embodiment of the invention.

Illustrative embodiments of the invention may be described herein in the context of video files associated with enterprise based applications. However, it is to be understood that techniques of the invention are not limited to enterprise based applications but are more broadly applicable to any applications in which video files are utilized.

As used herein, the term "enterprise" is understood to broadly refer to any entity that is created or formed to achieve some purpose, examples of which include, but are not limited to, an undertaking, an endeavor, a venture, a business, a concern, a corporation, an establishment, a firm, an organization, or the like.

As used herein, the term "meeting" is understood to broadly refer to a coming together or gathering of persons and/or entities in a physical sense and/or a virtual sense (i.e., via computing devices connected via a network, also referred to as an "online meeting").

As used herein, the term "video" is understood to broadly refer to a moving sequence of images representing one or more scenes. Video can have an audio component as well the visual component. Video can be in a recorded file format, or it can be a real-time stream.

As used herein, the term "shot" is understood to broadly refer to one or more consecutive images (frames) that constitutes a unit of action in a video.

As used herein, the term "slide" is understood to broadly refer to an image (frame) in a video that corresponds to an electronic (computer-generated) or written document prepared by a speaker or video director as an aid to communicate a message better to the viewer. It is to be understood that a "screen-share" frame may be considered to be a slide. Screen-share frames are frames that are part of the video file which include images of what a presenter sees (and controls) on his/her computer screen, and is sharing with an audience.

As used herein, the term "thumbnail" (or "thumbnail image") is understood to broadly refer to a reduced size image (i.e., reduced in size as compared to its original size).

As will be explained in detail below, illustrative principles of the invention provide users with a static video summary, that enable them to get a quick overview of what the video is about and click on hyperlinks to segments of video playbacks and a link to the full playback of the video. This summary is designed to improve the efficiency of sharing videos over various content sharing platforms such as, for example, email. That is, instead of attaching a video in an email, the sender can upload it to a video sharing system and then have the chance to share a URL link (if it is available) to the playback of the video together with its thumbnail summary in an email. Then, the receiver has the chance to decide whether or not to watch or download the video. Such a system reduces the time, space, and bandwidth costs of video sharing drastically, especially (but not limited to) in enterprises.

Such a system can also be integrated with calendar applications such that the recorded meeting video summaries can automatically appear in the related meeting slot in a person's calendar, right after the e-meeting recordings analysis is finalized in a central video sharing system. This also improves the accessibility of the meeting recordings in enterprises.

It is realized that a video summarization system has to be fast in order to be used in such settings where users can get fast response from the analysis system. So the complexity of the video summarization algorithm should be kept as low as possible. Besides, the video summarization method should work well for different types of videos that are typically shared in enterprises.

In accordance with illustrative principles of the invention, we introduce a low complexity video summarization method for different types of enterprise videos such as, for example, commercial clips, talk videos, or e-meeting screen and slide share recordings. The generated summary comprises salient thumbnails selected from video frames based on a ranking that takes into consideration certain importance metrics. The inventive methodology, in one embodiment, uses slide detection and optical character recognition (OCR) analysis to improve the quality of the summary. The OCR data can also be aligned with the timeline of the video and used for indexing and searching the video content. Generated summary information may be presented in an Extensible Markup Language (XML) file where begin and end times of the selected shots are also included.

This video summary can be used in different applications such as, by way of example only, email, calendar, and video retrieval in enterprise collaboration systems.

In accordance with an embodiment of the invention, when a user wants to share a video file in an email, or share a video link, the video summary would comprise small static thumbnails that are integrated into the body of sender's email. These thumbnails are also hyperlinked to the section of the video that they represent. This gives visual information about the content of the shared video. Based on the visual information, the receiver can decide to open/download/watch the full video or clips of interest or not watch it at all. This will save time to the receiver.

In enterprises, most of the meetings are recorded and shared through an enterprise Intranet (private internal network). For these recorded meetings, in accordance with an embodiment of the invention, the static thumbnail summaries of meeting recordings can be generated automatically and integrated with the calendar of the people. Once a video summary is generated, it is shown in the corresponding meeting slot (calendar entry) of a calendar application. This summary provides easy access to some memory cues for the person who attended the meeting, and it provides a quick overview for those who were invited but were not able to attend. By clicking over the thumbnail frames shown in the calendar, users can go to the specific parts of the meeting recordings. Using the thumbnail frames, that particular shot can also be shared with others instead of sharing the whole video.

The OCR output generated as a side product of summarization provides text for the video frames. This text is saved with time information. OCR text can be integrated with enterprise search engines for videos to provide a way to find results that link to certain points or segments on the video timeline.

Many advantages flow from such an inventive video summary methodology. For example, the methodology works well with different types of videos such as, by way of example, commercial clips, talk videos, or c-meeting screen and slide share recordings. Presentation videos and slide frames are recognized automatically without using any a-priori information. With a slide detection methodology according to an embodiment of the invention, slide frames and slide transitions are detected with suitable accuracy. The slide transition detection is performed by checking similarity of high frequency contents of successive frames. The similarity is computed with a correlation coefficient which yields suitable detection accuracy. Slide detection is supported with shot detection process. In one embodiment, if a shot has slide frames (detected with high frequency content correlations), all other frames in that shot are tagged as slides as well. This improves the slide detection accuracy.

Further, advantageously, the video shot clustering complexity is $O(n^2)$. For the video summarization methodology according to an embodiment of the invention, slide and non-slide frames are ranked separately. This leads to a higher quality summary result instead of ranking all video frames ignoring their nature. To compute slide frame ranks, OCR output, slide duration, and slide content metrics are used. To measure the slide content metric, the standard deviation of the frame intensity histogram is used. This metric is sensitive to busy content in slides such as graphics, images, tables, etc. Busy slides usually include interesting information. To rank nonslide frames, cluster diversity is measured. If a cluster has high diversity (if it is significantly different from other clusters), it gets higher rank than other clusters. This process increases the thumbnail summary diversity significantly. To reduce the redundancy in thumbnail frames, a final similarity check is done, checking first order statistics of intensity histograms of thumbnails. If a redundancy is detected, one of the highly-similar thumbnail frames is replaced with a non-similar one using first order histogram statistics. This step also improves the diversity of the video summary thumbnails. This similarity comparison is preferably left to the last step to keep the time cost low, since instead of comparing a whole histogram vector, we compare just four statistics to find similar frames in the selected thumbnail set.

Still further, advantageously, the OCR metric also helps to find the slides that have large font text which will help the receiver comprehend the content better as thumbnails are presented in a small size.

Referring initially to FIG. 1, an automatic static video summarization system 100, according to an embodiment of the invention, is shown. System 100 comprises an automatic static video summarization engine 104 which receives an input video 102 (e.g., video file that can be live or recorded) and generates a thumbnail (static) summary 106 of the video as an output. The summary 106 is generates by the engine 104 by employing an automatic static video summarization methodology, one embodiment of which is depicted in FIG. 2A.

FIG. 2A illustrates an automatic static video summarization methodology 200, according to an embodiment of the invention. As shown, in step 202, shots and/or slides are detected from the input video (102 in FIG. 1). The detected shots and/or slides are clustered in step 204. The slots and/or slides are ranked in step 206. In step 208, shots and/or slides are selected for the static summary. Then, in step 209, the static summary (106 in FIG. 1) is generated.

We now explain illustrative embodiments of the various steps depicted in the methodology 200 of FIG. 2A.

As shown in step 202 of FIG. 2A, a first step of the video summary is shot detection. Shot detection is done by checking the similarities of color and intensity histograms (e.g., histograms of YUV channels) of successive video frames in the input video. As is known with regard to color spaces, the Y in YUV stands for "luma," which is brightness, or lightness, while U and V provide color information and are "color difference" signals of blue minus luma (B-Y) and red minus luma (R-Y), respectively.

Figure 3:
FIG. 3 illustrates an example of shot detection, according to an embodiment of the invention.
Figure 4:
FIG. 4 illustrates another example of shot detection, according to an embodiment of the invention.

In accordance with illustrative embodiments, histogram similarity is measured by computing the correlations between the histograms of the successive video frames. Shot transitions are determined by comparing histogram correlations with empirically determined decision thresholds for three color spaces (e.g., YUV). For any two successive frames, if all three correlation coefficients are lower than the decision thresholds, a shot is detected at the current position. Otherwise, the two successive frames are assigned to a same shot slot. Two shot detection examples 300 and 400 of the inventive algorithm are given in FIGS. 3 and 4, respectively.

In accordance with FIG. 2B, a detailed description of a shot detection methodology according to one embodiment of the invention is as follows (note that this methodology would be an example of step 202 of FIG. 2A):

1. Decode subject video and extract video frame images with sampling period P (e.g., P=2 for short videos, P=5 sec. for long ones). This is shown in step 210 of FIG. 2B.

2. Read all the frames, resize them to a thumbnail resolution w*h (e.g., 160*120) pixels and save them with highest JPEG quality (Q100). This is shown in step 211 of FIG. 2B.

3. Read all resized video frames, crop them from their center. This is shown in step 212 of FIG. 2B.

4. Downsize the cropped frames again for histogram computation (to reduce the computation time). This is shown in step 213 of FIG. 2B.

5. Convert RGB values cropped frames to YUV color domain. This is shown in step 214 of FIG. 2B.

6. For all cropped and downsized frames, compute YUV histograms:

$H_Y(i), H_U(i), H_V(i)|i=1, \ldots, N$ where N is the number of the extracted video frames. This is shown in step 215 of FIG. 2B.

7. Compute correlation between color and intensity histograms of successive frames:

$F_Y(j), F_U(j), F_V(j)|j=1, \ldots, N-1$

This is shown in step 216 of FIG. 2B.

8. Compare $F_Y(j), F_U(j), F_V(j)$ with $T_Y, T_U, T_V$ shot detection thresholds. This is shown in step 217 of FIG. 2B.

9. If $F_Y(j), F_U(j)$, and $F_V(j)$ are all smaller than the shot detection thresholds, a shot is detected at jth video frame. This is shown in step 218 of FIG. 2B.

10. This is done for all video frames (from 1 to N). Finally, all shots are determined. This is shown in step 219 of FIG. 2B.

Many enterprise videos contain frames that include presentation slides. Since slide frames mostly contain text, graphics, and/or tables, their content is usually different from non-slide video shots. Slide frames should be evaluated separately from other video frames during the summarization process. Thus, it is important to determine slide positions and transitions in a given video for summarization. After slide frames are detected, optical character recognition (OCR) can also be applied to extract the text of the recorded presentation. This extracted text can then be used to generate a better video summary. Besides, the OCR text can be used annotate and/or index the video. So, through a search engine, people can have access to the video or even its slide frames. Thus, with OCR feature, the video content becomes more accessible and searchable.

In this illustrative embodiment, the content change in successive video frames is utilized to detect slide transitions. It is assumed that the content of the slide frames should not change quickly. Based on this assumption, the successive slide frames should be very similar to each other and this similarity can be detected through the edge positions of the frame content.

In accordance with FIG. 2C, details of a slide detection methodology according to an illustrative embodiment of the invention are as follows (note that this methodology would be a further example of step 202 of FIG. 2A):

1. Apply two dimensional (2D) high pass filtering to all video frames. This is shown in step 220 of FIG. 2C.

2. For all successive filtered frames, compute frame correlations. This is shown in step 221 of FIG. 2C.

3. If correlation of two filtered successive frames is higher than slide-transition threshold T, the two successive frames are tagged as a slide. That is, slide-transition threshold T is used to determine if two successive frames are too similar in a metric that emphasizes the edges that characterize slides or non-natural frames such as screen-shares. This is shown in step 222 of FIG. 2C. Thus, this slide detection methodology of FIG. 2C can be used to detect screen-share frames.

4. This is comparison is done to all filtered frames. This is shown in step 223 of FIG. 2C.

5. To improve the detection accuracy, frame similarity information is used. If one frame is tagged as slide in a shot, all other frames in that shot are tagged as slide too, regardless of their high pass filtered content correlations. This is shown in step 224 of FIG. 2C.

6. Accordingly, all likely slide frames are detected. This is shown in step 225 of FIG. 2C.

Two dimensional high pass filtering in the first step highlights the edge details of the video frames. For a steady video part, the edge detail positions should not change much. Even if the lighting conditions vary, the correlations of the high pass filtered image pixels can detect the content changes successfully. FIGS. 5A and 5B illustrate examples 500 and 520, respectively, of slide detection with edge correlations, according to an embodiment of the invention.

It is possible that some slide shots can be missed in this detection process if their content changes very frequently. To detect those slide frames, the shot information is utilized. Let some frames in shot k be tagged as slide. Since all frames in a given shot should be similar to each other, all frames in shot k are tagged as slide.

Recall that the next step in the presented methodology is clustering (204 in FIG. 2A). That is, after all shots and slide transitions (if any) are detected, similar shots are mapped into clusters to prevent displaying redundant frames in video summary thumbnails. In one embodiment, this is achieved using a non-supervised shot clustering methodology. Before applying clustering, a representative frame is assigned for each shot. If a shot does not have any slide frames, its representative frame is selected as the middle of that shot. For shots containing slide frames, the first frames of the shots are selected as representative frames, since the first slide of a presentation may contain important information such as title, author, etc.

Figure 2D:
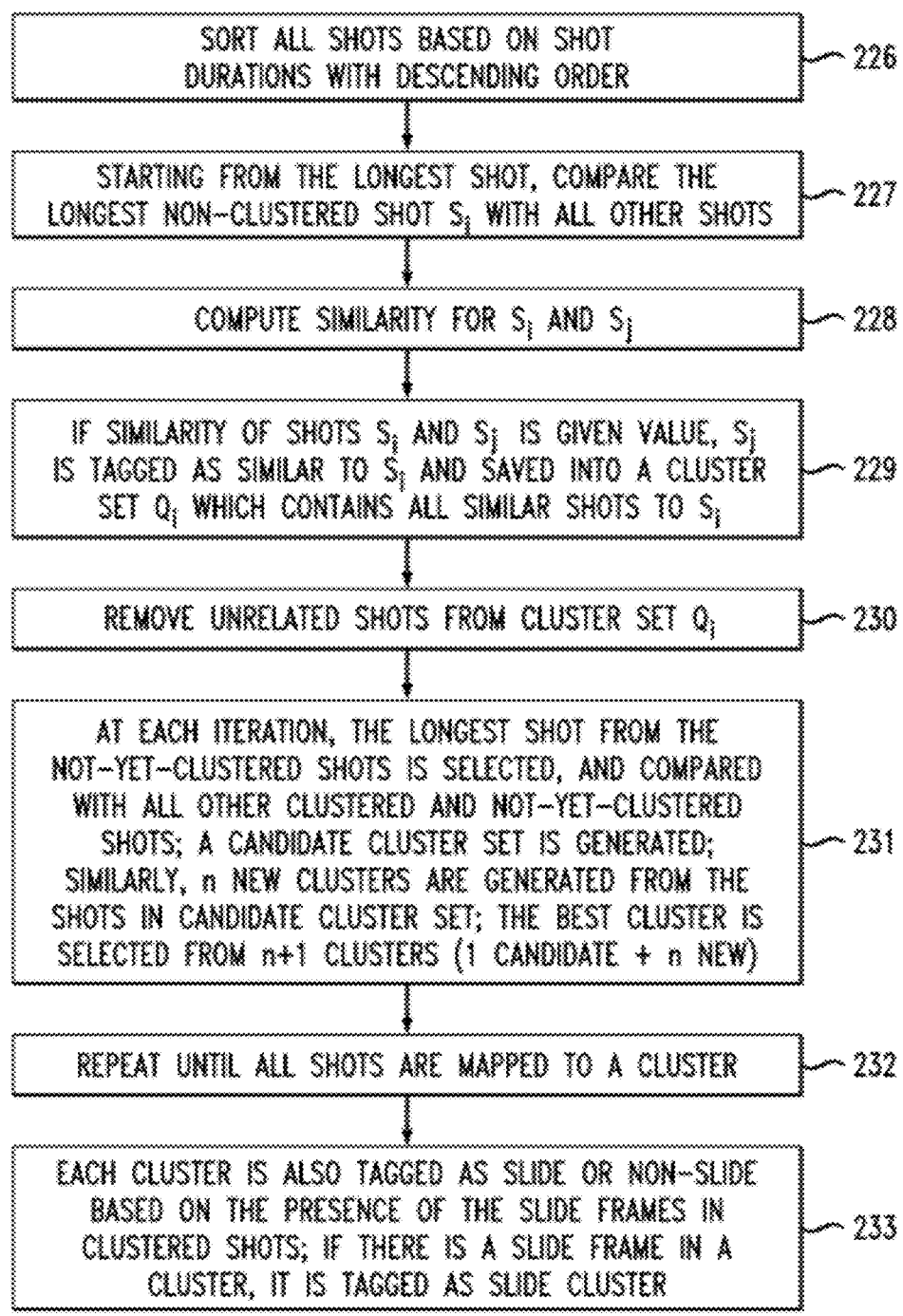
FIG. 2D illustrates a clustering methodology, according to an embodiment of the invention.

In accordance with FIG. 2D, detailed steps of a clustering methodology according to an illustrative embodiment of the invention are as follows (note that this methodology would be an example of step 204 of FIG. 2A):

1. Sort all shots ($S_i$|i=1, ..., M, where M is the number of shots) based on shot durations with descending order. This is shown in step 226 of FIG. 2D.

2. Starting from the longest shot, compare the longest non-clustered shot $S_i$ with all other shots. This is shown in step 227 of FIG. 2D.

3. To find similar shots to $S_i$, let histograms of YUV channels of two shot frames be $H_Y(i)$, $H_U(i)$, $H_V(i)$ and $H_Y(j)$, $H_U(j)$, $H_V(j)$. The similarity of $S_i$ and $S_j$ is computed as:

$$d_Y = \text{corr}(H_Y(i), H_Y(j));$$

$$d_U = \text{corr}(H_U(i), H_U(j));$$

$$d_V = \text{corr}(H_V(i), H_V(j));$$

where 'corr' is correlation coefficient function.

To combine these three similarity values:

$$A = (d_Y >= (T_Y))$$

$$B = (d_U >= (T_U))$$

$$C = (d_V >= (T_V))$$

$$D = \text{sum}([d_Y, d_U, d_V] > 0.99) == 2$$

where ($T_Y$, $T_U$, $T_V$) are pre-set thresholds. ($T_Y$, $T_U$, $T_V$) could be equal to (0.65, 0.55, 0.55) for one particular setup.

Similarity $(S_i, S_j) = \max([(A*B*C), D])$ this is either 0 or 1; 1 means shots are similar. This is shown in step 228 of FIG. 2D.

4. If Similarity( ) of shots ($S_i$ and $S_j$) is 1, $S_j$ is tagged as similar to $S_i$ and it is saved into a cluster set $Q_i$ which contains all similar shots to $S_i$. This is shown in step 229 of FIG. 2D.

To get a satisfactory clustering result, similarity of shot frames in each cluster should be as high as possible while the variability between the clusters is also high. In one embodiment, this can be achieved by selecting different correlation thresholds ($T_Y$, $T_U$, $T_V$). If these thresholds (shown in the cluster selection example 600 of FIG. 6 as gray circles) are too low, the intra-cluster variability becomes too high. On the other hand, if the thresholds are selected as too high, the inter-cluster variability becomes too low. So, these thresholds should be selected considering inter and intra-cluster variability. Although all shots in cluster set $Q_i$ are tagged as similar to $S_i$, some of them may have completely different contents from other shots (check first example in FIG. 6; the cluster in the figure has two different types of shots). In that case, non-coherent shots should be removed from the cluster $Q_i$. However, comparing each shot in cluster $Q_i$ with all other shots in the same cluster may increase the computational complexity significantly.

5. One solution to this problem, keeping the complexity as $O(n^2)$, is to remove unrelated shots from cluster $Q_i$. This is shown in step 230 of FIG. 2D. To remove unrelated shots from $Q_i$, a constant number of alternative cluster sets are generated from a randomly selected constant number of shots from $Q_i$, and the best cluster in terms of average shot similarity to the shot representative is selected as a final cluster. This process is also shown in FIG. 6. In FIG. 6, the first cluster set on the left has different types of shots. However, when a new cluster is generated (on the right) using S(3) instead of S(1), the unrelated shots are removed and another two similar shots are added to the cluster.

Illustrative details of this methodology, according to an illustrative embodiment, are as follows:

(a) Given a shot $S_i$ and its cluster set $Q_i$, select 4 (this could be any other constant number that is less than the size of $Q_i$) random shots $R_1(i), \ldots, R_4(i)$ from $Q_i$.

(b) Compare each random shot R (cluster representative) with all the other shots using histogram correlations, and generate alternative cluster sets ($QR_{1i}, \ldots, Q_{4i}$).

(c) For Qi and all the other alternative cluster sets $QR_{1i}, \ldots, QR_{4i}$, compute the average similarity of the cluster shots to their cluster representatives (S(i), $R_1(i), \ldots, R_4(i)$).

(d) Pick a cluster which has the maximum average similarity between the shots of that cluster and the cluster representative.

(e) The average cluster similarity is computed as follows:
The similarity between two shots (S(i) (cluster representative) and S(j)) is:

$$d(i, j) = \sqrt{\text{corr}(H_i^{hue}, H_j^{hue})^2 + \text{corr}(H_i^{sat}, H_j^{sat})^2 + \text{corr}(H_i^{val}, H_j^{val})^2}$$

where corr is the correlation coefficient, $H^{hue}, H^{sat}, H^{val}$ are histograms of Hue, Saturation, and Value channels, respectively. The average similarity of all shots in cluster $Q_i$ to cluster representative S(i) is:

$$D_i = (1/L_i) * \sum_{i \in Clusters | i \neq k} (d(i, j))$$

j=1 to $L_i$
where $L_i$ is the number of all shots in $Q_i$.

6. At each iteration, longest shot L from the not-yet-clustered shots is picked. L is compared with all other clustered and not-yet-clustered shots. A candidate cluster set is generated. Similarly, 4 new clusters are generated from the shots in candidate cluster set. The best cluster is selected from 5 clusters (1 candidate+4 new). Sometimes the best cluster candidate may contain shots which belong to other clusters. In that case, the cluster candidate is merged to the cluster to which most of the shots in the candidate cluster belong. This is shown in step 231 of FIG. 2D.

7. This process is repeated until all shots are mapped to a cluster. This is shown in step 232 of FIG. 2D.

8. At the end, each cluster is also tagged as slide or non-slide based on the presence of the slide frames in clustered shots. If there is a slide frame in a cluster, it is tagged as "slide cluster." This is shown in step 233 of FIG. 2D.

Figure 2E:
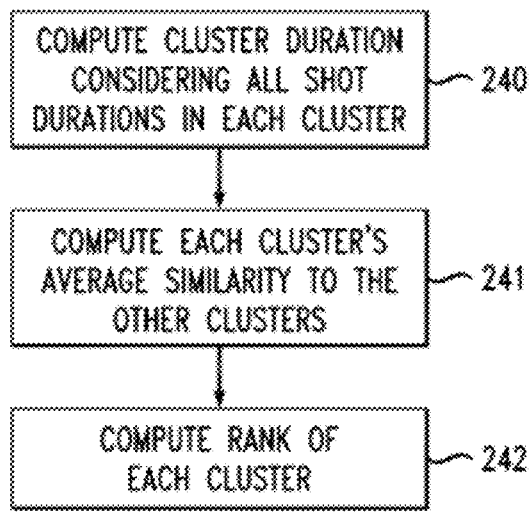
FIG. 2E illustrates a cluster ranking methodology, according to an embodiment of the invention.

Recall that the next step in the methodology is ranking (206 in FIG. 2A). Ranking of clusters can be performed, in one embodiment, as depicted in FIG. 2E:

1. For all clusters, compute cluster duration considering all shot durations in each cluster. Let ith cluster duration be duration($Q_i$). This is shown in step 240 of FIG. 2E.

2. For all clusters, compute each cluster's average similarity to the other clusters. This is shown in step 241 of FIG. 2E. Let $RF_i$ be the ith cluster's representative frame. The similarity between $Q_i$ and $Q_j$ is:

$$d(i, j) = \sqrt{\text{corr}(H_i^{hue}, H_j^{hue})^2 + \text{corr}(H_i^{sat}, H_j^{sat})^2 + \text{corr}(H_i^{val}, H_j^{val})^2}$$

where corn is the correlation coefficient, $H_i^{hue}, H_i^{sat}, H_i^{val}$ are the histograms of the representative frame $RF_i$ of the $Q_i$.

The average similarity of $Cluster_i$ to all the other clusters is:

$$ClusterSimilarity(i) = (1/N_c) * \sum_{i \in Clusters | i \neq j} (d(i, j))$$

j=1 to $N_c$ where $N_c$ is the number of clusters.

3. In one embodiment, we assume that longer clusters are more important than others. Besides, we want thumbnail frames as diverse (low average cluster similarity) as possible. Considering these criteria, we compute the ith cluster rank as:

$$ClusterRank(i) = ClusterDuration(i) * e^{(-w * ClusterSimilarity(i))}$$

where w is the scaling factor for the cluster similarity values.

If a cluster is relatively long in duration and has high diversity (i.e., non-similarity to other clusters), it will be ranked higher than other clusters. This is shown in step 242 of FIG. 2E.

Since the content of presentation slides are significantly different from non-slide video shots, in one embodiment, slide frames are ranked among each other. Once all slide transitions are detected, OCR is applied to each detected slide shot and the corresponding text output is saved in a file for video indexing. In one embodiment, in terms of thumbnail readability and appeal to human comprehension, we assume that the slides that have less text with large fonts are better than the slides with long text with small fonts. Therefore, we assign the slides with less text higher rank than the others.

We also assign the highest rank to the first slide frame of the video sequence, since it may contain title, presenter name, date, etc. of the presentation, and it is preferably always shown in the thumbnail summary.

Figure 2F:
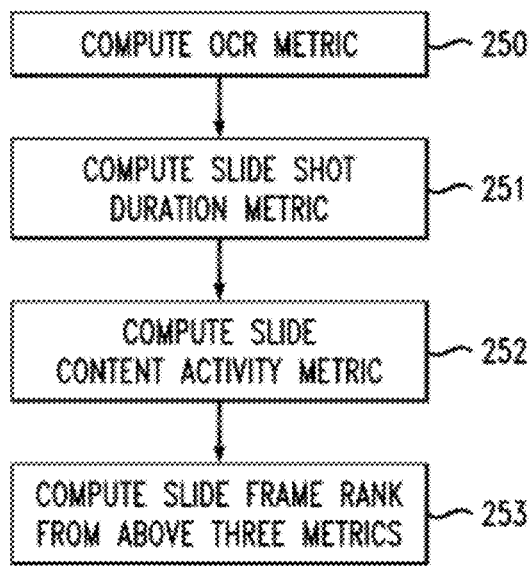
FIG. 2F illustrates a slide frame ranking methodology, according to an embodiment of the invention.

To compute slide frame rank, we compute three metrics, as shown in FIG. 2F:
1) OCR metric (step 250 of FIG. 2F);
2) Slide shot duration metric (step 251 of FIG. 2F); and
3) Slide content activity (histogram range) metric (step 252 of FIG. 2F).

The slide frame rank is computed, in step 253 of FIG. 2F, from the above three metrics.

The slides in the thumbnail summary should be clear, readable (e.g., metric 1: less text with large fonts), and give important information about the content of the presentation.

If a presenter spends more time on a particular slide frame, then that frame is probably a very important part of the presentation (e.g., metric 1 long slide duration) and therefore shown in the thumbnail summary.

In addition, the system favors slides with graphics, tables, etc. to improve the visual appeal of the end result summary. To detect such visually busy slide frames, the content activity is measured over the intensity histograms of the slide frames. If intensity histogram of a frame has high variance, it is more likely that the frame contains graphics, images, or tables (e.g., metric3: high standard deviation). The third metric is also used to detect and ignore completely blank images since the variance of their histogram is too low.

For slide frame i, the metrics are defined as:
OcrMetric(i)=$NO1_i + NO2_i$, where $NO1_i$ is the number of extracted text from slide frame i. In general, the OCR output is noisy. After removing the noise (e.g., non ASCII characters) from the OCR output, the final OCR text is saved into an XML file together with the corresponding segment information of the video for future search indexing. The number of corrected characters is also saved into the XML file as $NO2_i$.

Segment information of the shot includes a begin and end time in the video as well as a URL to the playback of the video with specified times, so a player capable of processing the begin and end time can play the specific segment that corresponds to this frame's shot. XML file also carries a hyperlink to where the image file for the thumbnail of the representative frame can be retrieved. A portion of a sample XML file for one of the summaries created by this system is as follows:

```
ocr.xml

<response status="ok">
<video meetingid="" video videoid="14" duration="168">
<segment begin="148" duration="6.0"
thumbnail_url="http://9.2.34.33/videoSummarization/video14/
000074.jpg">
<OCR text="how cool is your bank " line="1"/>
</segment>
<segment begin="154" duration="4.0"
thumbnail_url="http://9.2.34.33/videoSummarization/video14/
000077.jpg">
<OCR text="www.ibm.comIbanking" line="1"/>
</segment>
</video>
</response>
```

```
thumbnails.xml

<response status="ok">
<video summarized="2009-12-23 12:49:30" meetingid="" videoid="14"
extractionduration="3.8711">
<segment begin="0.0" duration="2.0" frameposition="0.0"
thumbnail_url="http://9.9.9.9/videoSummarization/video14/000000.jpg">
</segment>
<segment begin="6.0" duration="2.0" frameposition="6.0"
thumbnail_url="http://9.9.9.9/videoSummarization/video14/000003.jpg">
</segment>
<segment begin="28.0" duration="28.0" frameposition="42.0"
thumbnail_url="http://9.9.9.9/videoSummarization/video14/000021.jpg">
</segment>
<segment begin="58.0" duration="2.0" frameposition="58.0"
thumbnail_url="http://9.9.9.9/videoSummarization/video14/000029.jpg">
</segment>
<segment begin="80.0" duration="6.0" frameposition="82.0"
thumbnail_url="http://9.9.9.9/videoSummarization/video14/000041.jpg">
</segment>
<segment begin="92.0" duration="8.0" frameposition="96.0"
thumbnail_url="http://9.9.9.9/videoSummarization/video14/000048.jpg">
</segment>
<segment begin="112.0" duration="4.0" frameposition="114.0"
thumbnail_url="http://9.9.9.9/videoSummarization/video14/000057.jpg">
</segment>
<segment begin="122.0" duration="8.0" frameposition="126.0"
thumbnail_url="http://9.9.9.9/videoSummarization/video14/000063.jpg">
</segment>
<segment begin="148.0" duration="4.0" frameposition="148.0"
thumbnail_url="http://9.9.9.9/videoSummarization/video14/000074.jpg">
</segment>
<segment begin="158.0" duration="2.0" frameposition="158.0"
thumbnail_url="http://9.9.9.9/videoSummarization/video14/000079.jpg">
</segment>
</video></response>
```

SlideDuration(i): The normalized duration of a given slide shot (the length of time between two slide transitions). The normalization is done over the sum of all slide durations.

SlideActivity(i)=std($H_{intensity}$(i)/$w_2$, where std is standard deviation function, $H_{intensity}$(i) is the intensity histogram of ith slide frame, $w_2$ is the weighting coefficient.

The OcrMetric is inverted to take higher values for fewer texts with an exponential function. Finally, the rank of the ith slide frame is computed as:

$$\text{SlideRank}(i) = e^{(-w1*OcrMetric(i))} * \text{SlideDuration}(i) * \text{SlideActivity}(i)$$

where $w_i$ is the weighting coefficient

Recall that the next steps in the methodology is selecting frames for the summary (208 in FIG. 2A) and generating the summary (209 in FIG. 2A). As mentioned above, in presentation videos, some frames may contain slides while others do not. So in that ease, slide and non-slide frames are ranked separately. Then, they are combined in the final summary based on their duration information. Each one of the two types of shots is given a proportion in the summary respective to their share in the full duration. For example, if half of the video consists of presentation slides, the summary (includes N thumbnails) is generated with $N_{slide}$=N/2 slide frames and $N_{nonslide}$=N/2 non-slide frames.

The nonslide thumbnails are simply selected from the highest ranked (ClusterRank) clusters which do not contain slide frames. The cluster representative frame is the middle frame of the longest shot in the cluster, and that frames' thumbnail image is added to the summary.

The slide thumbnail frame selection is slightly different from nonslide thumbnail selection. Once, all slide frame ranks are computed, the slide frames are selected using both cluster and rank information. If there are K clusters containing slide frames, the total number of slide frame slots in the summary, $N_{slide}$, is divided into K pieces based on the duration of slide clusters. In other words, if a slide cluster contains most of the slide frames, that cluster will contribute more thumbnails than the others. While selecting slide frames from each slide cluster, their rank is used. Simply, the highest ranked frames are preferred to the lower ranked ones.

Finally, the slide and nonslide frames are combined together. Their frame number, shot information, start and end times of their shots are all saved into an XML file in chronological order according to the start times.

In general, OCR operation is very time consuming. For applications which require fast response, thumbnails are generated without using the OcrMetric. To accommodate this need, our system outputs two separate XML file. One is written before the OCR process starts and in that summary the slide frames are ranked using only the slide duration and activity metrics. Once OcrMetric is computed, another, final, XML file is created with the set of thumbnails selected using all 3 slide ranking metrics.

When N thumbnail frames are selected, a final check is performed to evaluate the quality of the summary and to replace likely redundant frames in the summary. In some cases, two high ranked clusters or slide frames may resemble each other and could be shown in the video summary. To make a final redundancy check, the first order statistics (Mean, Variance, Skewness, Kurtosis) of the intensity histograms of thumbnail frames are utilized. If values of three out of these four statistics are close for two thumbnail frames, one of them is removed and another video frame is selected to replace it. To replace another frame with the redundant one, the new frame is compared with all other thumbnail frames to make sure their first order statistics is not very close. This process is repeated for other frames until the new thumbnail candidate is significantly different from all other thumbnail frames in the summary in terms of their first order histogram statistics.

FIG. 7A illustrates an example of a thumbnail summary result (static video summary) 710 and a corresponding text file 720 generated via execution of the automated static video summarization methodology according to an embodiment of the invention.

Figure 7B:
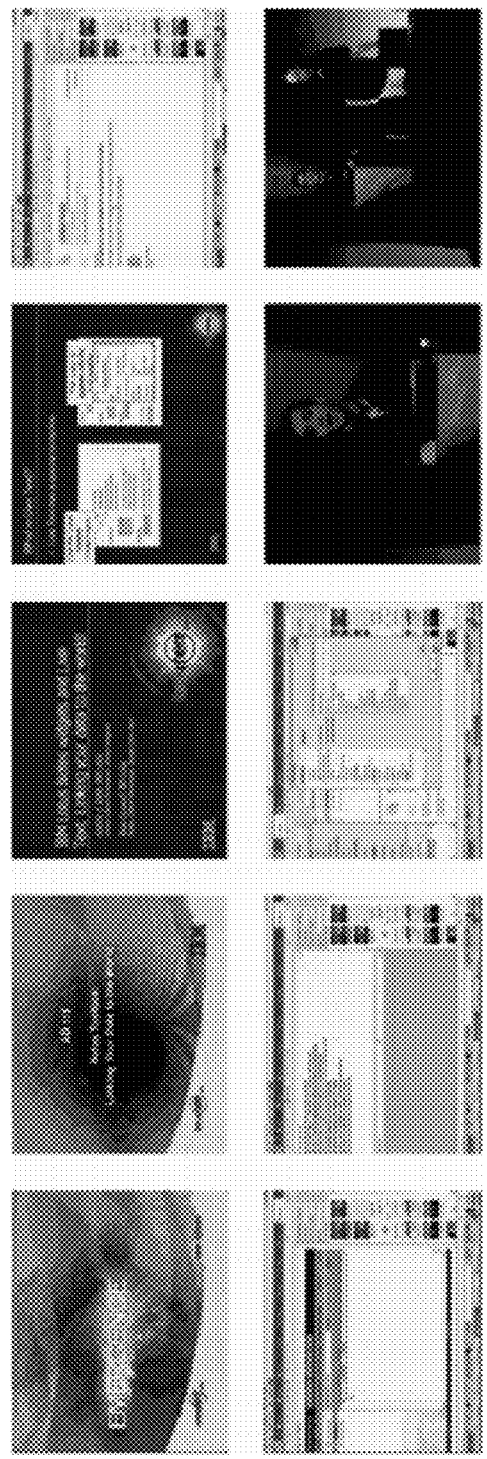
FIG. 7B illustrates an example of thumbnail summary results which include screen-share frames, according to an embodiment of the invention.

FIG. 7B illustrates an example of a thumbnail summary result (static video summary) 730 with screen-share frames generated via execution of the automated static video summarization methodology according to an embodiment of the invention.

FIG. 8 illustrates an email generation methodology 800, according to an embodiment of the invention. In step 802, an email is composed. In step 804, it is determined whether the email message contains a video file as an attachment or a link to a video file. In step 806, the video is automatically uploaded to a server for processing (this a server that hosts the automatic static video summarization engine 104 of FIG. 1).

In step 808, a static hyperlinked summary of the video file is generated in accordance with the inventive techniques described herein. The static hyperlinked summary is included in the email, and the actual video file is removed from the email, in step 810. One or more segments of the video that correspond to each thumbnail can be played back to the user by clicking on a corresponding thumbnail.

FIG. 9 illustrates a calendar entry generation methodology 900, according to an embodiment of the invention. In step 902, an online meeting is recorded as a video file. In step 904, the method identifies one or more calendar entries (e.g., invitations) corresponding to the meetings in the database of a calendar application computer program. In step 906, a static hyperlinked summary of the video file is created in accordance with the inventive techniques, described herein and, in step 908, the static hyperlinked summary is included in the one or more identified calendar entries. One or more segments of the video that correspond to each thumbnail can be played back to the user by clicking on a corresponding thumbnail.

Advantageously, as illustratively described herein, principles of the invention provide a video summarization system that generates a visual summary of a video that can easily be shared in an e-mail document or added to a calendar entry or any HTML document. The summary may also provide hyperlinks to segments of the video that is available for playback in a video sharing system. Furthermore, principles of the invention provide a new way of sharing videos in an enterprise environment that is an alternative to attaching a video file to emails.

Further advantageously, some of the illustrative hypotheses used in developing the video summarization system of the invention include the following: (i) frames that are completely blank or has only one color should be discarded. In other words, frames with low variance of intensity are discarded; (ii) video shot clusters with longer durations are more important (shots detected based on the content change); and (iii) clusters that are not similar to many of the other clusters are important. Less probable shots have higher information value.

Illustrative hypotheses used only for slides include:

(i) first and second slides presented in the video will always be in the summary (even though there may have been several separate presentations, we do not detect presentation changes nor the introduction slides to separate different talks);

(ii) slide-shot duration; the longer the better (a specific slide detection algorithm is used to separate slide shots);

(iii) number of characters extracted from OCR is used to find less crowded slides as they will be easier to read in small thumbnail size; font size or type can also be used for detecting the same feature;

(iv) high slide intensity histogram standard deviation is better; high variance means higher information; if this value is high it means the slide is busy, probably has graphics, or figures or pictures;

$$\text{Rank}(slide_i) = M_{STD} * \frac{M_{dur}}{TotalDuration} * e^{(-M_{OCR}*v_k)}$$

i.e., multiply the above three metrics (with normalization);

(v) for slide selection, the number of slides selected (later will be included in the video summary) is determined based on the ratio of the total number of slide frames and the total number of entire video frames; this metric is used to favor slides while constructing the final summary (for example, if a talk had 80% of slides, that will be reflected in the summary);

(vi) to select slides for the video summary, first, we need to select slide clusters to pick summary slides from (based on the cluster duration); then, the slide ranking is used to select the predetermined number of summary slides from each slide cluster; by doing this, we increase the diversity (instead of using a global slide ranking to select slides);

After this step, another similarity check is performed as follows:

All N frames are compared using histogram correlations in YUV color space as used in clustering step If similar frames are detected new candidate frame is selected and compared with others If similar frame is a slide frame, the candidate frame is selected from slide frames If similar frame is not a slide, the candidate frame is selected from non-slide frames This last step takes constant time as there is a limit on maximum number of frames in the summary. Histogram statistics are used to evaluate the diversity of the summary frames set.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1-9, the diagrams in the figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-9, can also include, as described herein, providing a system, wherein the system includes distinct modules (e.g., modules comprising software, hardware or software and hardware). By way of example only, the modules may include, but are not limited to, an automatic static video summarization module, a shot/slide detection module, a shot/slide clustering module, a shot/slide ranking module, a shot/slide selection module, and a static summary generation modules. These and other modules may be configured, for example, to perform the steps described and illustrated in the context of FIGS. 1-9.

Figure 10:
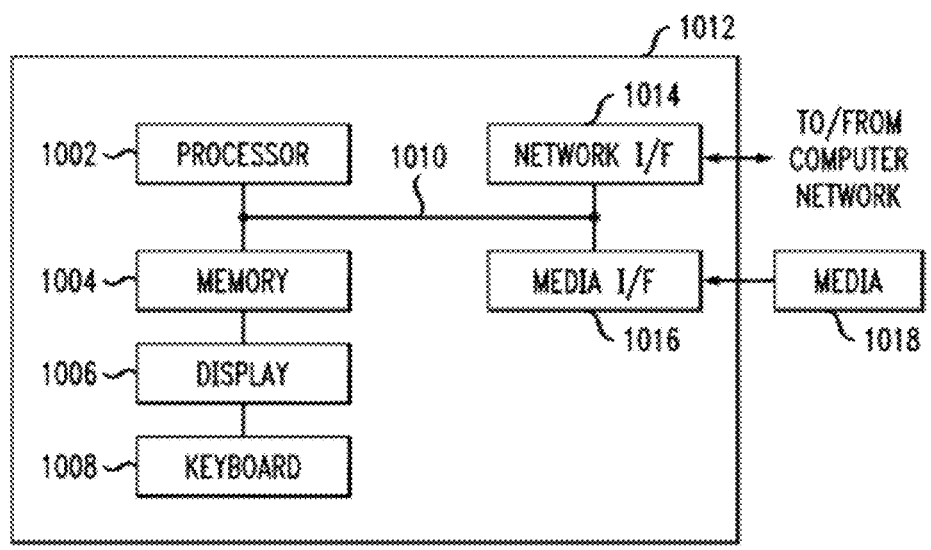
FIG. 10 illustrates a computing system in accordance with which one or more components/steps of the techniques of the invention may be implemented, according to an embodiment of the invention.

One or more embodiments can make use of software running on a general purpose computer or workstation. With reference to FIG. 10, such an implementation 1000 employs, for example, a processor 1002, a memory 1004, and an input/output interface formed, for example, by a display 1006 and a keyboard 1008. The term "processor" as used herein is intended to include any processing device, such as, for example, one that includes a CPU (central processing unit) and/or other forms of processing circuitry. The processing device is preferably capable of processing video files. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer).

The processor 1002, memory 1004, and input/output interface such as display 1006 and keyboard 1008 can be interconnected, for example, via bus 1010 as part of a data processing unit 1012. Suitable interconnections, for example, via bus 1010, can also be provided to a network interface 1014, such as a network card, which can be provided to interface with a computer network, and to a media interface 1016, such as a diskette or CD-ROM drive, which can be provided to interface with media 1018.

A data processing system suitable for storing and/or executing program code can include at least one processor 1002 coupled directly or indirectly to memory elements 904 through a system bus 1010. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 908 for making data entries; display 1006 for viewing provenance graph and data; pointing device for selecting data; and the like) can be coupled to the system either directly (such as via bus 1010) or through intervening I/O controllers (omitted for clarity).

Network adapters such as network interface 1014 may also be coupled to the system to enable the data processing system to become coupled to other data processing systems or remote printers or storage devices through intervening private or public networks. Modems, cable modem and Ethernet cards are just a few of the currently available types of network adapters.

As used herein, a "server" includes a physical data processing system (for example, system 1012 as shown in FIG. 10) running a server program. It will be understood that such a physical server may or may not include a display and keyboard.

That is, it is to be understood that the components shown in FIG. 1 may be implemented on one server or on more than one server.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of creating a static summary of a video, comprising: detecting shots in the video, wherein the detected shots are frames of the video having a correlation; clustering the detected shots into clusters based on similarity; ranking the clusters of shots; selecting at least a portion of the shots based on cluster ranking for inclusion in the static summary; and generating the static summary by combining thumbnail images of the selected shots, wherein prior to the ranking step, the method further comprises detecting a presence of slides in any of the shots, and ranking of a given shot is based in part on whether the shot is a slide, wherein the ranking step further comprises ranking the shots that contain slides among each other, wherein the slides are assigned to higher or lower ranks based on an amount of text in the slides, wherein ranking of shots of the video that contain slides further comprises ranking based on a slide content activity metric to detect visually busy slide frames.

2. The method of claim 1, wherein the detection of shots in the video that do not contain slides further comprises:
    determining color and intensity histograms for frames in the video;
    computing a correlation between the color and intensity histograms of successive frames;
    comparing histogram correlation results with shot detection threshold values; and
    identifying a frame as a shot based on shot detection threshold value comparison results.

3. The method of claim 1, wherein the detection of slides in the video further comprises:
    computing frame correlations for successive frames; and
    tagging successive frames as a slide when the correlation between the successive frames is at least greater than a slide transition threshold value.

4. The method of claim 3, wherein prior to frame correlation computing, frames in the video are filtered using a two dimensional high pass filter.

5. The method of claim 3, wherein, when one frame in a given shot is tagged as a slide, all other frames in the given shot are tagged as slides.

6. The method of claim 1, wherein a frame comprising a screen-share image is detected as a slide.

7. The method of claim 1, wherein clustering the detected shots into clusters based on similarity further comprises:
    sorting shots based on shot duration;
    finding shots similar to the longest non-clustered shot, wherein similarity is based on a correlation coefficient function; and
    assigning the longest non-clustered shot and the shots found to be similar to the longest non-clustered shot to a given cluster.

8. The method of claim 7, further comprising removing shots with unrelated content from the given cluster.

9. The method of claim 8, wherein the removal of unrelated shots from the given cluster further comprises:
    selecting a given number of random shots from the given cluster;
    comparing each random shot with other shots;
    generating alternative clusters based on the random shot comparisons;
    computing an average similarity for each of the given cluster and the alternative clusters; and
    selecting the cluster with the maximum average similarity as the cluster used in the ranking step.

10. The method of claim 7, wherein prior to clustering, a representative frame is assigned to each shot.

11. The method of claim 10, wherein the middle of the shot is selected as the representative frame when the shot does not contain any slides.

12. The method of claim 10, wherein the first frame of the shot is selected as the representative frame when the shot contains a slide.

13. The method of claim 1, wherein the ranking further comprises:
    ranking shots that do not contain slides; and
    for any shots in which slides were detected, performing optical character recognition on elements in the slides.

14. The method of claim 13, wherein the ranking of shots of the video that do not contain slides further comprises ranking based on duration and diversity.

15. The method of claim 13, wherein ranking of shots of the video that contain slides further comprises ranking based on readability and human comprehension.

16. The method of claim 13, wherein ranking of shots of the video that contain slides further comprises ranking based on an optical character recognition metric.

17. The method of claim 13, wherein ranking of shots of the video that contain slides further comprises ranking based on a slide duration metric.

18. The method of claim 1, further comprising generating textual information corresponding to the thumbnail images of the static summary.

19. The method of claim 18, wherein the textual information is searchable.

20. The method of claim 18, wherein the textual information comprises a uniform resource locator which is selectable to playback some or all of the video corresponding to the thumbnail images of the static summary.

21. The method of claim 1, wherein when it is determined that the video is attached to an email message or the email message contains a link to the video, further comprising the step of including the generated static summary in the email message in place of the video, wherein some or all of the video is selectable for playback using one or more hyperlinks associated with the static summary.

22. The method of claim 1, wherein when the video is a recording of a meeting, further comprising identifying one or more calendar entries corresponding to the meeting in a database of a calendar application program, and including the generated static summary in the one or more calendar entries, wherein some or all of the video is selectable for playback using one or more hyperlinks associated with the summary.

23. An article of manufacture for creating a static summary of a video, the article of manufacture comprising a non-transitory computer readable storage medium having tangibly embodied thereon computer readable program code which, when executed, causes a computer to: detect shots in the video, wherein the detected shots are frames of the video having a correlation; cluster the detected shots into clusters based on similarity; rank the clusters of shots; select at least a portion of the shots based on cluster ranking for inclusion in the static summary; and generate the static summary by combining thumbnail images of the selected shots, wherein prior to ranking the clusters of shots, the computer readable program code, when executed, further causes the computer to detect a presence of slides in any of the shots, and ranking of a given shot is based in part on whether the shot is a slide, wherein the shots that contain slides are ranked among each other, wherein the slides are assigned to higher or lower ranks based on an amount of text in the slides, wherein ranking of shots of the video that contain slides further comprises ranking based on a slide content activity metric to detect visually busy slide frames.

* * * * *